(12) United States Patent
Qiu et al.

(10) Patent No.: US 7,537,020 B2
(45) Date of Patent: May 26, 2009

(54) VACUUM BREAKING DEVICE

(75) Inventors: Thomas Qiu, Shenzhen (CN); Jerry Gao, Shenzhen (CN)

(73) Assignee: Globe Union Industrial Corp. (GUIC), Taichung (TW)

( * ) Notice: Subject to any disclaimer, the term of this patent is extended or adjusted under 35 U.S.C. 154(b) by 399 days.

(21) Appl. No.: 11/486,209

(22) Filed: Jul. 14, 2006

(65) Prior Publication Data

US 2008/0029160 A1 Feb. 7, 2008

(51) Int. Cl.
*E03C 1/10* (2006.01)
(52) U.S. Cl. .................................. 137/217; 137/409
(58) Field of Classification Search ................ 137/202, 137/217, 409, 416, 433
See application file for complete search history.

(56) References Cited

U.S. PATENT DOCUMENTS

| | | | | |
|---|---|---|---|---|
| 2,325,956 A | * | 8/1943 | Holtman | 137/218 |
| 4,453,561 A | * | 6/1984 | Sands | 137/327 |
| 4,862,913 A | * | 9/1989 | Wildfang | 137/543 |
| 5,529,086 A | * | 6/1996 | Kasugai et al. | 137/202 |

* cited by examiner

*Primary Examiner*—Stephen M Hepperle
*Assistant Examiner*—Craig M Schneider
(74) *Attorney, Agent, or Firm*—Ming Chow; Sinorica, LLC

(57) ABSTRACT

A vacuum breaking device includes a housing, a sealing base, a floating cup and a sealing ring. The housing has a liquid inlet, a liquid outlet and an air passageway. The sealing base is installed in the air passageway, and the floating cup is installed in an inner chamber of the sealing base. The sealing ring is fitted around an upper end of the floating cup for properly sealing the outer-air inlet in the upper portion of the sealing base and communicating with the inner chamber. The floating cup has an annular flange for increasing the buoyancy of the floating cup, so that the outer-air inlet may be quickly sealed up. The annular flange has plural air paths, so the vacuum condition may be broken immediately when a vacuum pressure is produced in the device.

9 Claims, 6 Drawing Sheets

VACUUM BREAKING DEVICE

BACKGROUND OF THE INVENTION

1. Field of the Invention

This invention relates to a vacuum breaking device, particularly to one breaking a vacuum condition swiftly by augmenting a floating force of a floating cup in the device, accelerating airflow and sealing of a passageway.

2. Description of the Prior Art

A conventional vacuum breaking device is often used in a large number of liquid supplying systems for breaking vacuum conditions in a pipe route so as to avoid dirty water being sucked in the pipe route, thus always supplying clean water.

As to the conventional vacuum breaking devices, they generally have either a complicated structure or inability to react swiftly to water supply disruption or pressure alteration in the pipe route. In other words, when the pipe route is in a normal functional condition, the conventional vacuum breaking device may be a little slow to keep outer air from coming in the device, so water may splash around. In case the water supply is suddenly disrupted from the water source, causing a vacuum condition by a siphoned phenomenon, it cannot permit outer air to flow quickly in to break the vacuum condition in the device. Therefore, a showerhead placed in a basin or a bathtub may suck dirty water into the pipe route, polluting the water source.

SUMMARY OF THE INVENTION

The feature of the invention is a housing provided with a liquid inlet, a liquid outlet and an air passageway, a sealing base installed in the air passageway, a floating cup installed in an inner chamber of the sealing base and a sealing ring fitted around an upper end of the floating cup. The sealing ring moves up together with the floating cup to seal the air inlet of the sealing base or moves down together with the floating cup in case of the floating cup falling down with a vacuum pressure produced in the device so that outer air may flow through the air inlet of the sealing base, breaking the vacuum condition in the device.

When the pressure of water flowing in the device increases, the floating cup can float up in a short time by means of its buoyancy reinforced by its own annular flange and seal the air inlet, to prevent water from flowing out. On the contrary, when a vacuum condition suddenly occurs in the flowing water in the device owing to disruption in water supply, outer air can swiftly flow through the air inlet in the device to force the floating cup swiftly move down and thus breaking the vacuum condition in the device.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
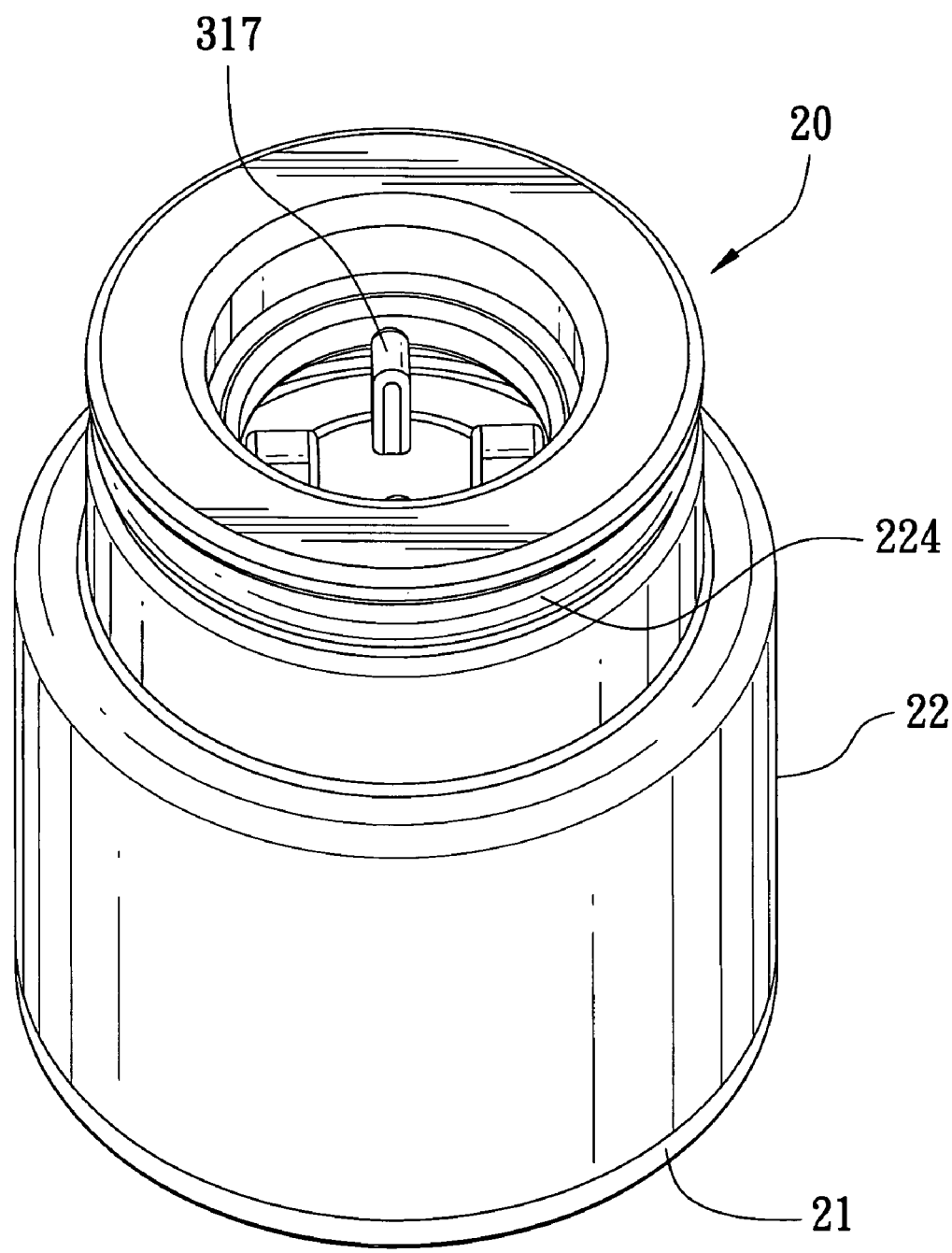
FIG. 1 is a perspective view of a vacuum breaking device in the present invention.
Figure 2:
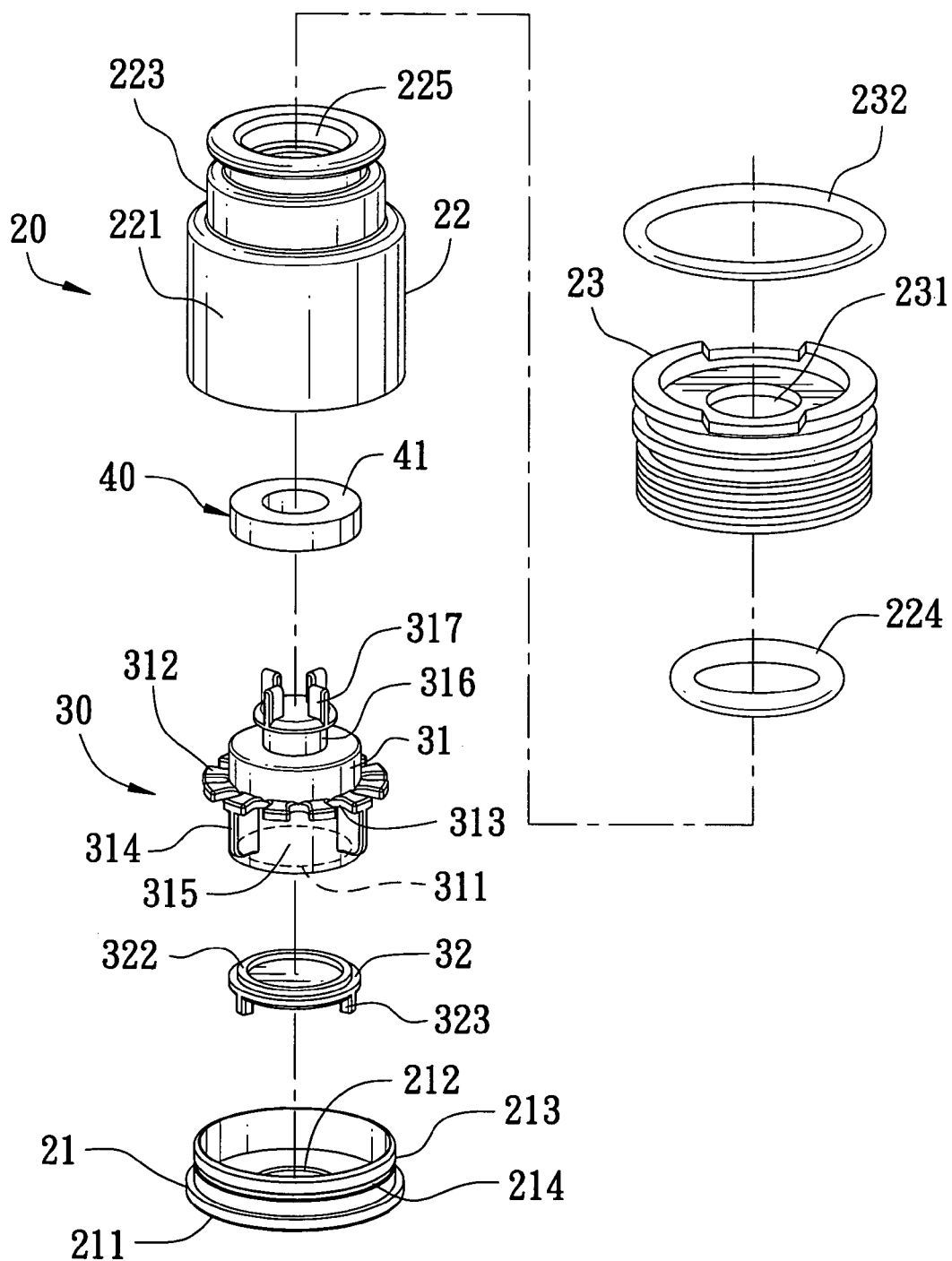
FIG. 2 is an exploded perspective view of the vacuum breaking device in the present invention.
Figure 3:
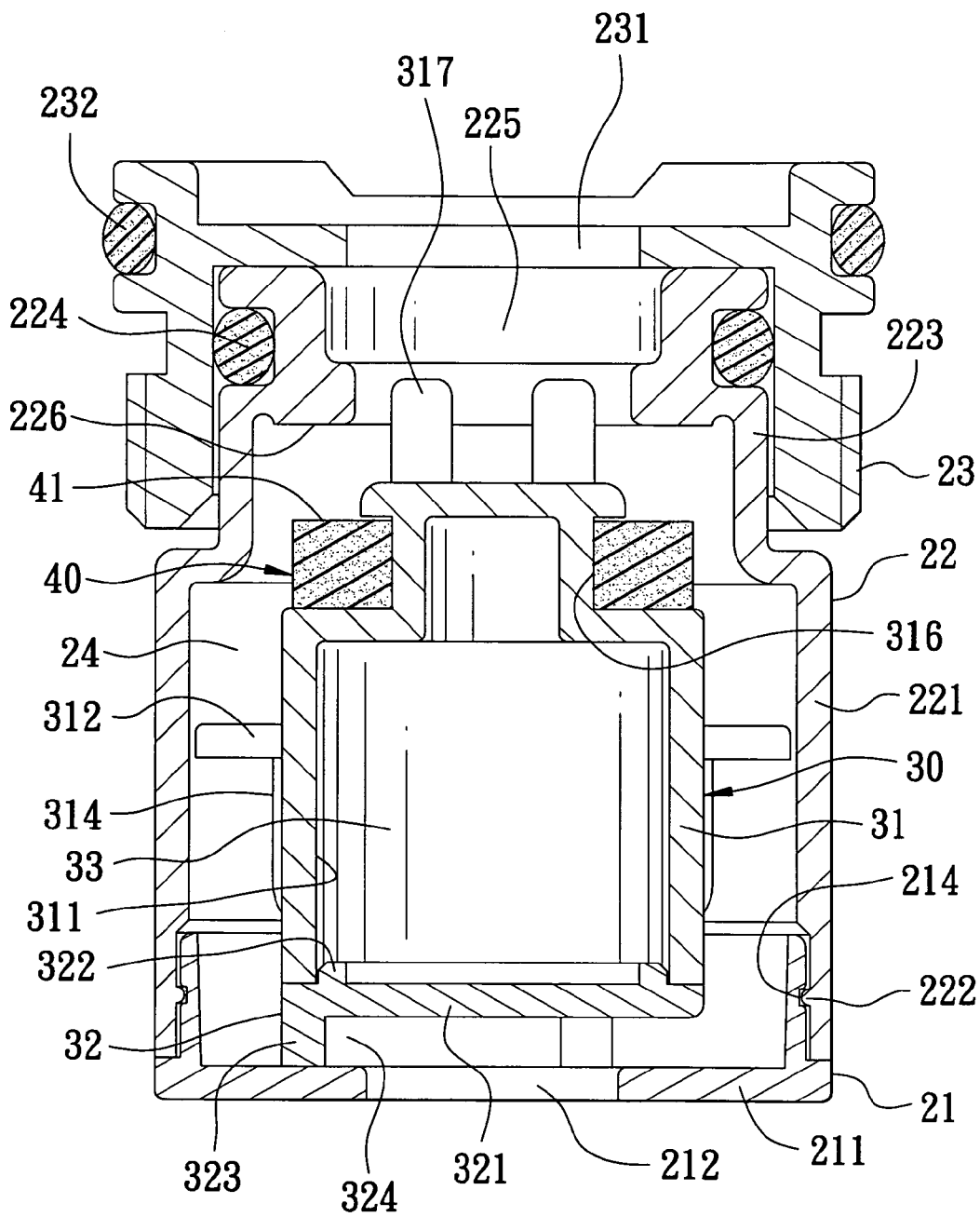
FIG. 3 is a cross-sectional view of the vacuum breaking device in the present invention.

A preferred embodiment of a vacuum breaking device in the present invention usable in a special liquid supplying system, as shown in FIGS. 1-5, includes a housing 10, a sealing base 20, a floating cup 30 and a sealing ring 40 as main components, having a structure similar as a conventional one does.

The housing 10 is provided with a liquid inlet 11 in the bottom, a liquid outlet 12 in a sidewall, an air passageway 13 in an upper portion, a nearly cross-shaped passageway 14 in an inner portion communicating with the liquid inlet 11, the liquid outlet 12 and the air passageway 13. Thus liquid flows in the liquid inlet 11, passing through the passageway 14 and out of the liquid outlet 12, but a small portion of liquid may flow into the air passageway 13.

The sealing base 20 is positioned in the air passageway 13 of the housing 10, consisting of a bottom base 21, an upper member 22 and a position base 23.

The bottom base 21 has a bottom wall 211, a center hole 212 facing an upper end of the passageway 14 and communicating with both the liquid inlet 11 and the liquid outlet 12, and an annular wall 213 extending up on the bottom wall 211 and having an annular groove 214.

The upper member 22 is cylindrical, having a lower cylindrical wall 221 of a large diameter with an annular ridge 222 formed in its inner surface to fit with the annular groove 214 of the bottom base 21. On the lower cylindrical wall 221 extends up an upper cylindrical wall 223, which has an outer-air inlet 225 in an upper surface, with an anti-leak ring 224 fitted around the upper end of the upper cylindrical wall 223. Then a chamber 24 is defined between the upper member 22 and the bottom base 21, communicating with the outer-air inlet 225, with an annular sealing surface 226 formed around the outer-air inlet 225.

The position base 23 is shaped as a cap, having a center hole 231 communicating with the outer-air inlet 225 of the upper member 23, sealed by the anti-leak ring 224. Further, the position base 23 has its lower half portion screwing tightly with the inner surface of the air passageway 13 and compressing down an upper edge of the upper member 22, and at the same time an anti-leak ring 232 fits around the upper portion of the upper member 22, closely contacting and sealing the wall defining the air passageway 13.

The floating cup 30 is positioned in the chamber 24 of the sealing base 20, consisting of a cup body 31 and a bottom cap 32.

The cup body 31 is provided with an inner space 311 opening downward, an annular flange 312 with plural air paths 313 around an outer surface, and the air paths 313 are formed as holes or openings (in this embodiment formed as notches just like openings). Further, four plate ribs 314 are formed spaced apart 90 degrees equidistantly to extend downward from the annular flange 312, defining a hollow area between every two plate ribs 314. In addition, an annular groove 316 is formed in an upper portion of the cup body 31, and four guideposts 317 are provided to extend up on an upper surface of the cup body 31, extending somewhat in the outer-air inlet 225 of the sealing base 20 at the same time to function for limiting its position.

The bottom cap 32 is flat, having a bottom wall 321, an annular wall 322 extending up on the bottom wall 321, located in a lower portion of the inner space 311 of the cup body 31 to define a closed chamber 33, and four posts 323 extending downward and spaced apart equidistantly. The four posts 323 rest on the surface around the center hole 212 of the sealing base 20 so that a gap 324 of a certain size may be formed between the bottom wall 321 of the bottom cap 32 and the bottom wall 211 of the sealing base 20 for gas or liquid to pass therethrough.

The sealing ring 40 is fitted around the annular groove 316 of the floating cup 30, having an upper annular surface 41 closely contacting the annular sealing surface 226 of the sealing base 20 when floating together with the floating cup 30 so as to seal up the outer-air inlet 225. If the floating cup 30 moves down in case a vacuum pressure is produced, it opens the outer-air inlet 225 for outer air to flow through in, breaking the vacuum condition in the passageway 14 in the housing 10.

Figure 5:
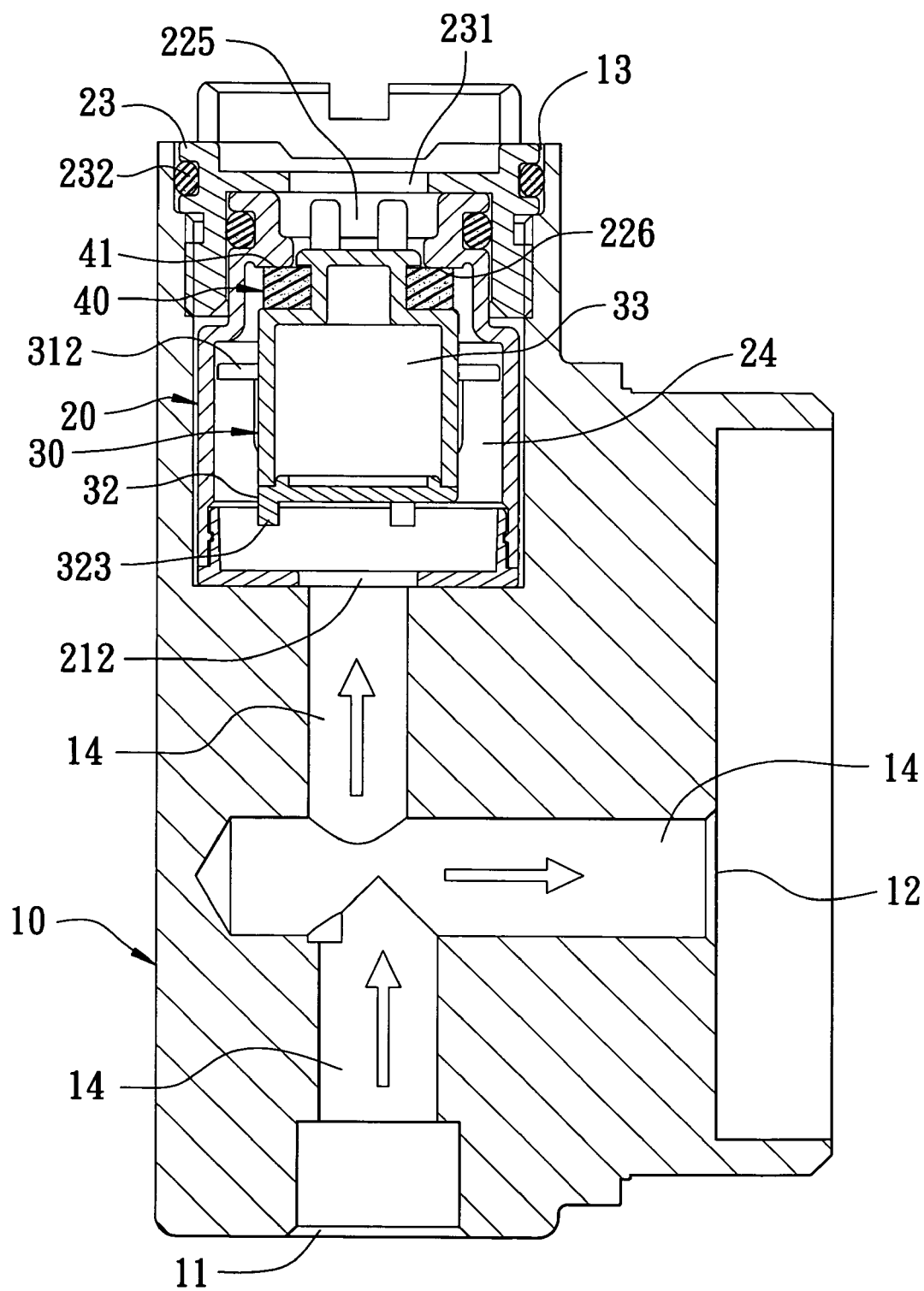
FIG. 5 is a cross-sectional view of the vacuum breaking device under using condition in the present invention; and, FIG. 6 is a cross-sectional view of the vacuum breaking device being in the breaking vacuum condition in the present invention.

Next, as shown in FIG. 5, if the liquid pressure in the device increases gradually, the floating cup 30 may be moved upward by both the liquid pressure and its own floating force and finally seal up the annular sealing surface 226 of the sealing base 20. Thus the liquid in the vacuum breaking device is prevented from shooting out of the outer-air inlet 225, ensuring the liquid to flow through the liquid inlet 11 and the passageway 14 and out of the liquid outlet 12.

Figure 4:
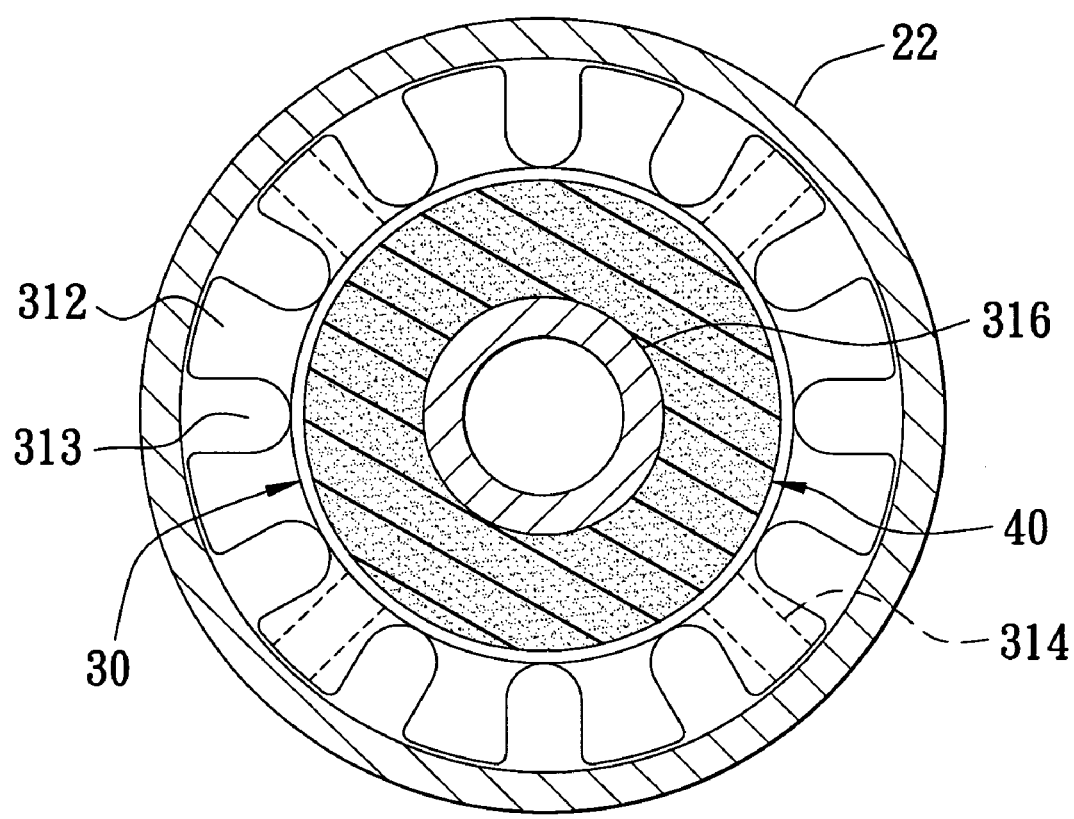
FIG. 4 is an upper cross-sectional view of the vacuum breaking device in the present invention.
Figure 6:
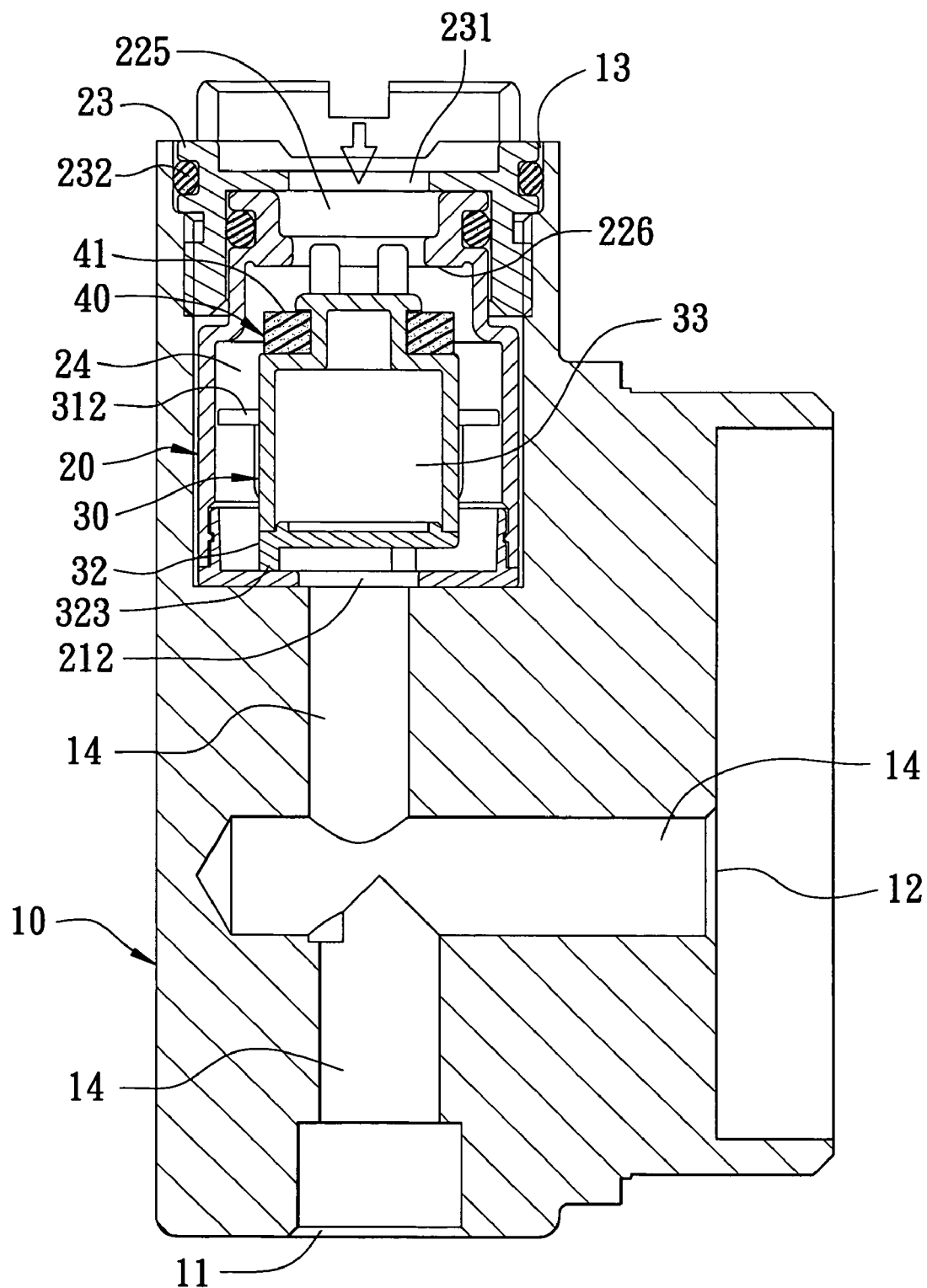

On the other hand, as shown in FIGS. 4 and 6, in case the inner liquid pressure gradually decreases, the floating cup 30 located in the chamber 24 of the sealing base 20 may gradually fall down because of the sucking function of the vacuum condition and its own weight, leaving away from the sealing surface 226 to open the outer-air inlet 225 for outer air to flow in therethrough. Then outer air orderly flows through the plural air paths 313 of the annular flange 312 of the floating cup 30 and into the passageway 14, thus breaking the vacuum condition in the passageway 14 to prevent the liquid from smoothly flowing through the liquid outlet 12 to the liquid inlet 11.

Next, it should be specially noted that when the flowing liquid pressure in the housing 10 gradually augments, the floating cup 30 may float up in a very short time owing to the floating force of the annular flange 312, accordingly sealing up the outer-air inlet 225 to prevent water mixed with fur from shooting out therethrough. Furthermore, when vacuum pressure is produced because of the flow pressure decreasing in the housing 10, outer air may flow in the housing 10 with the floating cup 30 falling down, quickly breaking the vacuum condition in the housing 10.

While the preferred embodiment of the invention has been described above, it will be recognized and understood that various modifications may be made therein and the appended claims are intended to cover all such modifications that may fall within the spirit and scope of the invention.

What is claimed is:

1. A vacuum breaking device to be used in a liquid supplying system, said device comprising:
    a housing provided with a liquid inlet, a liquid outlet and an air passageway, liquid made to flow from said liquid inlet to said liquid outlet in said housing;
    a sealing base installed in said air passageway of said housing and having an inner chamber and an outer-air inlet communicating with said inner chamber, an annular sealing surface formed around said outer-air inlet;
    a floating cup installed in said inner chamber of said sealing base and provided with an annular flange extending radially outward and spaced apart equidistantly from its outer surface, said annular flange having plural air paths for air to flow up and down therethrough, wherein said floating cup is further provided with a closed air chamber in its interior, and wherein the floating cup consists of a cup body and a bottom cap, said cup body has an inner space opening downward, said bottom cap seals a bottom end of said cup body, and said closed air chamber is defined between said cup body and said bottom cap;
    a sealing ring fitted around an upper portion of said floating cup and floating together with said floating cup to contact closely said annular sealing surface of said sealing base as to seal up said outer-air inlet, said sealing ring moving down together with said floating cup as to open said outer-air inlet when a vacuum condition happens in said device; and
    plural plate ribs are provided to extend down from a preset portion of said annular flange, and an open area is formed between every two of said plate ribs for gas and liquid to flow through.

2. The vacuum breaking device as claimed in claim 1, wherein said air paths of said annular flange of said floating cup are notches.

3. The vacuum breaking device as claimed in claim 1, wherein said sealing base is composed of a bottom base, an upper member located on said bottom base, and a position base fixed on said air passageway of said housing for limiting the position of said upper member.

4. The vacuum breaking device as claimed in claim 3, wherein said bottom base and said upper member define a chamber between.

5. The vacuum breaking device as claimed in claim 3, said bottom base further has a hole communicating both with said liquid inlet and said liquid outlet 6. The vacuum breaking device as claimed in claim 3, wherein said upper member has its upper end formed with said outer-air inlet and said annular sealing surface.

7. The vacuum breaking device as claimed in claim 1, wherein said annular flange of said cup body is set at a preset height.

8. The vacuum breaking device as claimed in claim 1, wherein said cup body is provided with an annular groove in an upper end portion for said sealing ring to fit tightly around, and plural guide posts extend up on an upper surface to properly extend in said outer-air inlet for guiding and limiting.

9. The vacuum breaking device as claimed in claim 1, wherein plural support posts extend down from said bottom of said bottom cap for supporting said floating cup so that said inner chamber of said sealing base communicates with said liquid inlet and liquid outlet via said bottom cap.

* * * * *